United States Patent
Cannon et al.

(10) Patent No.: US 7,029,130 B2
(45) Date of Patent: Apr. 18, 2006

(54) CONTRAST AND BRIGHTNESS ENHANCING APERTURES FOR ILLUMINATION DISPLAYS

(75) Inventors: Bruce L. Cannon, Portland, OR (US); Gary B. Kingsley, Beaverton, OR (US); Frederic R. Engstrom, Hillsboro, OR (US); Peter R. Oehler, Aloha, OR (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/748,653

(22) Filed: Dec. 30, 2003

(65) Prior Publication Data

US 2005/0140933 A1    Jun. 30, 2005

(51) Int. Cl.
*G03B 21/14* (2006.01)
*G02F 1/00* (2006.01)
*G02B 6/10* (2006.01)

(52) U.S. Cl. ............................ 353/97; 353/20; 353/31; 348/771

(58) Field of Classification Search .................. 353/20, 353/30, 31, 33, 81, 88, 89, 97, 99; 348/755, 348/770, 771
See application file for complete search history.

(56) References Cited

U.S. PATENT DOCUMENTS

| 5,442,414 | A | 8/1995 | Janssen et al. |
| 5,552,922 | A | 9/1996 | Magarill |
| 5,625,738 | A | 4/1997 | Magarill |
| 6,591,022 | B1 * | 7/2003 | Dewald ........................ 382/274 |
| 6,607,280 | B1 * | 8/2003 | Koyama et al. ............... 362/31 |
| 6,719,429 | B1 | 4/2004 | Peterson |
| 6,724,546 | B1 * | 4/2004 | Nishimae et al. ........... 359/740 |
| 6,773,120 | B1 * | 8/2004 | Colpaert ....................... 353/122 |
| 2001/0026450 | A1 * | 10/2001 | Li ................................. 362/298 |
| 2003/0147052 | A1 | 8/2003 | Penn et al. |
| 2003/0202259 | A1 | 10/2003 | Nishimae et al. |
| 2004/0080723 | A1 * | 4/2004 | Inamoto ......................... 353/97 |
| 2004/0119950 | A1 * | 6/2004 | Penn et al. .................... 353/97 |

FOREIGN PATENT DOCUMENTS

WO    WO 03/063509    7/2003

OTHER PUBLICATIONS

"DLP™ Projector System Optics Contrast-Enhancement Techniques" Application report DLPA006A, published by Texas Instruments, Jun. 2001.

* cited by examiner

*Primary Examiner*—William B. Perkey
*Assistant Examiner*—Andrew Sever
(74) *Attorney, Agent, or Firm*—George W. Jonas

(57) ABSTRACT

The present invention is particularly useful for projection systems in which portions of an unwanted light beam overlap with the image beam. Such an overlap reduces the image contrast. Under the present invention, an aperture is used to restrict the extent of the unwanted beam while an integrator changes the shape of the light beam illuminating the image display device. The integrator changes the illumination beam so as concentrate the light in those areas of the illumination beam that are transmitted through the aperture. When the aperture and the integrator are used together in the projection system, both the image brightness and the image contrast are increased.

25 Claims, 5 Drawing Sheets

CONTRAST AND BRIGHTNESS ENHANCING APERTURES FOR ILLUMINATION DISPLAYS

FIELD OF THE INVENTION

The invention relates to optical displays and more particularly to optical systems used to illuminate optical displays.

BACKGROUND

Projection systems, for projecting an image on to a screen, use several different components for providing efficient illumination of an imager. Projection systems typically use a lamp to generate the illumination light, with several optical elements being interposed between the lamp and the imager display device to transfer the light to the image display device. The image display device imposes an image on a beam of light. It may perform this function through different mechanisms, for example by absorption, as with a photographic slide, by polarization, as with a liquid crystal display (LCD), or by diverting the light, as with a micromechanical array of individually addressable, tiltable mirrors.

Characteristics that are important in projection systems include the brightness and the contrast of the image. It is often the case that one characteristic may be improved, but at the expense of another characteristic. It is, therefore, important to be able to increase contrast while reducing the negative impact on image brightness and to increase image brightness while reducing the negative impact on contrast.

SUMMARY OF THE INVENTION

The present invention is particularly useful for projection systems in which portions of an unwanted light beam overlap with the image beam. Such an overlap reduces the image contrast. Under the present invention, an aperture is used to restrict the extent of the unwanted beam while an integrator changes the shape of the light beam illuminating the image display device. The integrator changes the illumination beam so as concentrate the light in those areas of the illumination beam that are transmitted through the aperture. When the aperture and the integrator are used together in the projection system, both the image brightness and the image contrast are increased.

One embodiment of the present invention is directed to an image display system that has an integrator capable of producing a non-circular output light beam when illuminated by a circular input light beam, and an image display unit disposed on the path of the non-circular, output light beam. A non-circular aperture is disposed on the path of the non-circular, output light beam, between the integrator and the image display unit.

Another embodiment of the present invention is directed to an optical system that has a light source capable of generating a beam of illumination light having an elliptical cross-section perpendicular to a direction of propagation. An image display unit is illuminated by the beam of illumination light. A non-circular aperture is disposed on the path of the beam of illumination light having the elliptical cross-section, the non-circular aperture being disposed between the light source and the image display unit.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
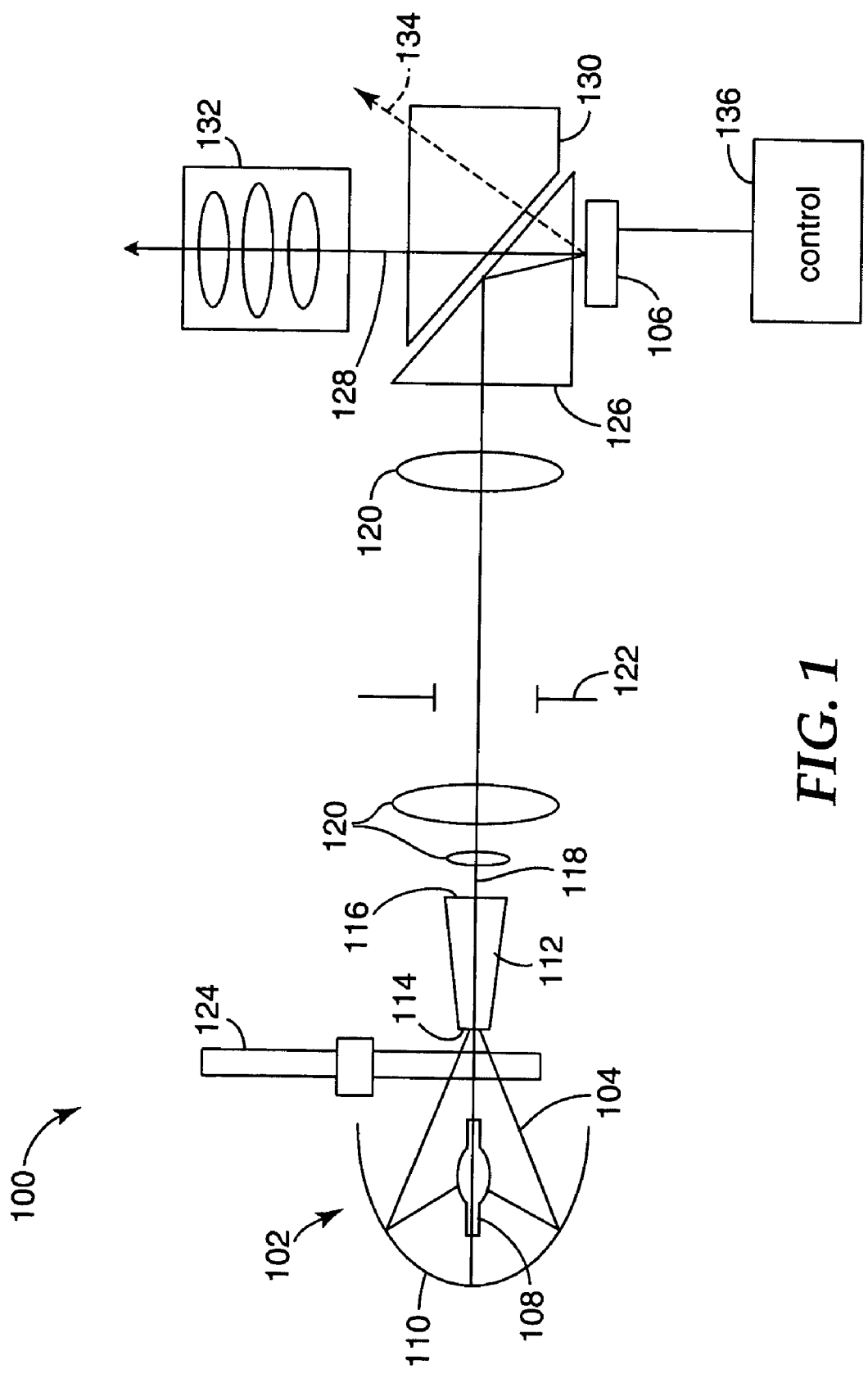
FIG. 1 schematically illustrates an embodiment of a projection system according to principles of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to image projection systems, and is particularly applicable to image projection systems that employ an array of tiltable mirrors for imposing an image on a beam of light.

The contrast of the image produced by many types of image projection systems can be improved if the illumination or projection light is stopped down. In some cases, the pupil stop-down need not be circular or symmetrical to best enhance the image contrast. One example of this is image display devices that uses an array of tiltable micromirrors. The light is, therefore modulated illumination and projection paths using angular separation. Such devices are available, for example, from Texas Instruments, Plano, Tex. under the product names DLP® (digital light processor) and DMD® (deformable mirror device).

An embodiment of a projection system 100, that is particularly useful for an image display device that uses a tiltable mirror array, is schematically presented in FIG. 1. A light source 102 generates light 104 for illuminating the image display device 106. The light source 102 may include an arc lamp 108 and a reflector 110 that collects the light from the arc lamp 108 and directs the collected light along the optical path to the image display device 106.

An integrator 112 is used to make the intensity profile of the illumination light 104 more uniform on the image display device 106. The integrator 112 may be a tunnel integrator. The light 104 enters the tunnel integrator 112 at the entrance end 114 and exits from the output end 116. The light is homogenized by multiple reflections off the reflecting walls of the tunnel integrator 112 so that the emitted illumination light 118 is nominally uniform at the output end 116. The integrator 112 may be formed, for example, from a hollow reflective tunnel, with front surface reflectors defining the tunnel walls. The output light 118 is homogenized via multiple reflections off the front surface reflectors within the tunnel. In another approach, the tunnel integrator 112 may be formed from a solid transparent body, for example a glass body, with the output light 118 being homogenized via total internal reflection off the walls of the transparent body. The solid body may also be provided with reflective coatings on its walls, so that reflection of the light does not rely only on total internal reflection. The integrator 112 is capable of changing the shape of the light beam passing therethrough. For example, where the input light beam 104 from the light source 102 is circular in shape, the homogenized light beam 118 is not circular. The homogenized light beam 118 may be, for example, elliptical. The generation of a non-circular homogenized beam in the tunnel integrator is discussed in greater detail below with reference to FIG. 3.

Optical relay optics 120 are used to relay the homogenized output light 118 to the image display device 106. The optical relay optics 120 are typically arranged so as to relay an image of the output end 116 of the integrator 112 on the imaging surface of the image display device 106. Accordingly, the integrator 112 may have an output aperture whose aspect ratio matches that of the imager display device 106. An aperture 122 may be placed between the integrator 112 and the image display device 106.

A color selector 124 may be positioned at some point between the lamp 108 and the image display device 106. In the illustrated embodiment, the color selector 124 is disposed close to the input end 114 of the integrator 112. The color selector 124 transmits light in only one color band at a time, and the image display device 106, under control of the control unit 136, synchronously imposes the image corresponding to that selected color band. A short time thereafter, the next color band is selected by the color selector 106 and the image display device synchronously imposes the image corresponding to that next color band. This process is repeated for all color bands and is then repeated for each successive image frame. The viewer's eye integrates the resulting image to see a multiple color image, even though only one color is projected at any one time. The color selector 124 may be any suitable device for selecting a desired color band. For example, the color selector 124 may be a color wheel, a color filter that rotates to different positions to allow light in different color bands to be transmitted. Other types of color selector may also be used.

In the illustrated embodiment, the image display device 106 is a tilted mirror array. The homogenized illumination light 118 may be directed onto the image display device 106 via a totally internally reflecting (TIR) prism 126, for example as described in U.S. Pat. No. 5,552,922, incorporated herein by reference. The mirrors of the image display device have two tilt states, the ON state and the OFF state. Light 128 reflected by the mirrors that are in the ON state is directed through the TIR prism 126 and the compensating prism 130 to the projection lens system 132. Light 134 reflected by the mirrors that are in the OFF state is directed through the prisms 126 and 130 in a direction that misses the projection lens system 132, so that the discarded, OFF light 134 is not projected. A control unit 136 is connected to the image display device 106 to control the orientations of the mirrors in mirror array, and thus control the image imposed on the image light 128. The control unit 136 may also control individual mirrors to spend more or less time in the ON state, so as to control the brightness of the different portions of the image.

Figure 2A:
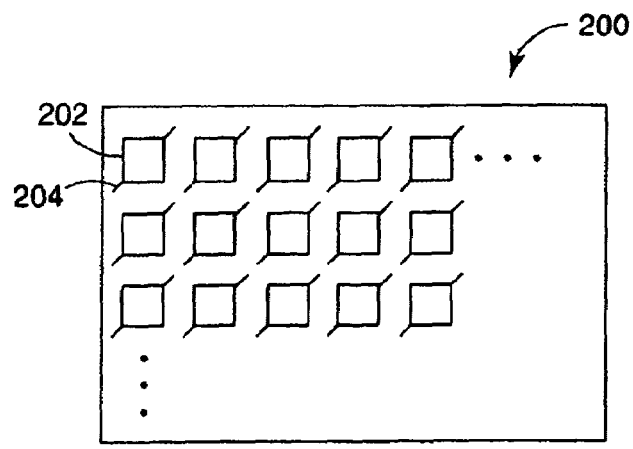
FIG. 2A schematically illustrates an array of tiltable micromirrors.

The tilting mirror array is now explained in greater detail with reference to FIGS. 2A and 2B. FIG. 2A shows a view of an embodiment of a tilting mirror array 200 that has an array of reflective mirrors 202. Each mirror 202 is mounted so as to be pivotable about a hinge 204 which is located at two diagonal corners of the mirror 202. In operation, when an ON voltage is applied to the mirror 202, the mirror 202 rotates to the ON position, illustrated as position 202a in FIG. 2B. When the mirror 202 is in the ON position, the light 218 from the light source 217 is directed by the mirror 202 as ON light 228 to the projection lens system 232. When an OFF voltage is applied to the mirror 202, the mirror 202 rotates to the OFF position, illustrated as position 202b. When the mirror 202 is in the OFF position, the discarded light 234 is directed so as not to enter the aperture of the projection lens system 232. The discarded light 234 may be incident on a light trap 236 so as to reduce problems from stray light.

Figure 2B:
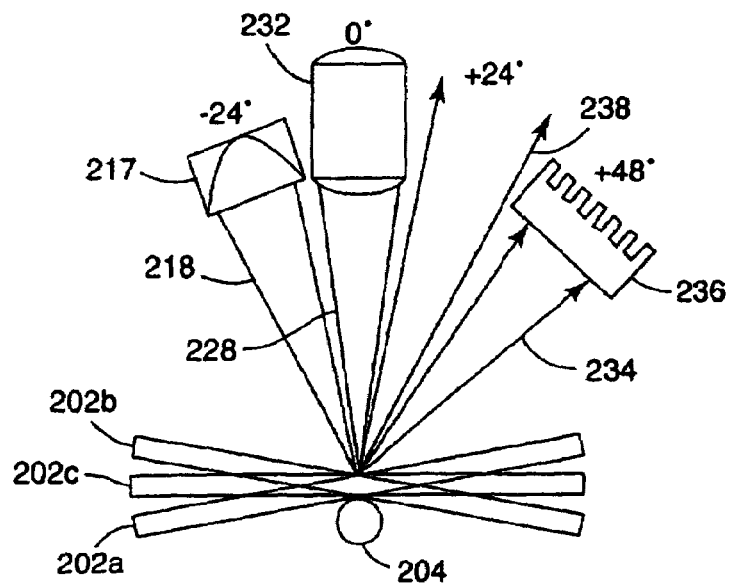
FIG. 2B schematically illustrates how the tiltable mirror array generates an image light beam, a discarded light beam and an unswitched light beam.

When there is no voltage applied to the mirror 202, the mirror 202 may move to the planar position, shown as position 202c in FIG. 2B. In such a case, any light incident on the mirror 202 is directed as unswitched light 238 in a direction between the ON light 228 and the OFF light 234.

In one type of tilting mirror array 200, the mirrors 202 can be rotated by 12° to either side of the planar position 202c. The convention adopted here is that the illumination light 218 is incident on the mirror 202 in a direction of −24°, the ON light 228 is directed in the direction 0°, normal to the unswitched planar position 202c, the unswitched light 238 is directed at +24° and the OFF light 234 is directed at +48°. More generally, where the mirror 202 can be tilted through an angle θ, the illumination light 218 is incident on the mirror 202 at an angle of −2θ, the ON light 228 propagates in the direction of 0°, the unswitched light propagates in the +2θ direction and the OFF light 234 propagates in the +4θ direction.

When illuminated by illumination light, a tilted mirror array 200 commonly reflects some light in the unswitched direction, irrespective of the orientation of the mirrors 202. This unswitched light arises because light is reflected from untilted surfaces, such as the substrate on which the mirrors 202 are mounted, and from the frame surrounding the mirrors 202.

Figure 3:
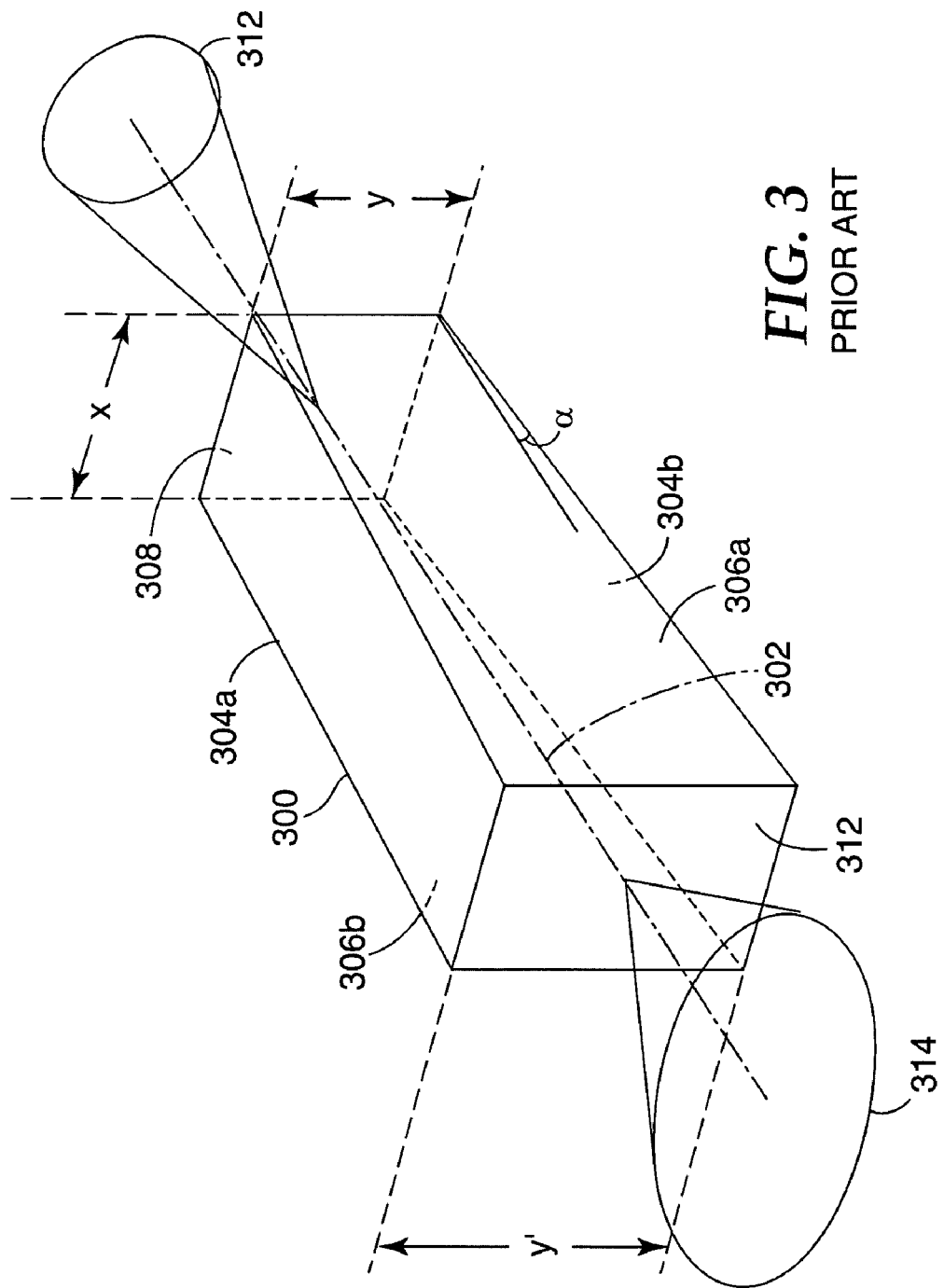
FIG. 3 schematically illustrates an embodiment of a light integrator that changes shape of the light beam according to principles of the present invention.

One example of an integrator 300 that can change the shape of the light beam is schematically illustrated in FIG. 3. The integrator 300 is a tunnel integrator and is placed on an axis 302. Two sides 304a and 304b of the integrator 300 are set at an angle, α, relative to the axis 302 and are, therefore, not parallel to the axis 302. The other sides 306a and 306b are parallel to the axis 302. Thus, the entrance aperture 308 has dimensions of x and y, and the exit aperture 312 has dimensions of x and y', where y'>y. Since the étendue of the system is conserved, the larger output aperture results in a reduced divergence in the output beam. Thus, when the input beam 310 has a circular angular distribution, the output beam 314 has an angular distribution that is compressed in one dimension. In the illustrated example, the output beam 314 has an elliptical angular distribution and propagates from the output aperture 312 as an elliptical beam. The tapered tunnel integrator is described more fully in U.S. Pat. No. 5,625,738, incorporated herein by reference.

It will be appreciated that other types of integrator may be used to change the shape of the input beam. For example, the integrator may be a tunnel integrator having a cross-sectional shape that is not square or rectangular. The tunnel integrator may, for example, have a circular input end and have a body that is tapered in one dimension so as to have an elliptical output end.

The elliptical output beam from the integrator may be used with a contrast enhancing pupil to provide increased brightness and contrast, as is now described with reference to FIGS. 4A, 4B and 5A–5D. The interaction of the shape-changing integrator with the different pupils and apertures of the projection system is quite complex, so the following description explains the projection system of the invention step by step.

Figure 4A:
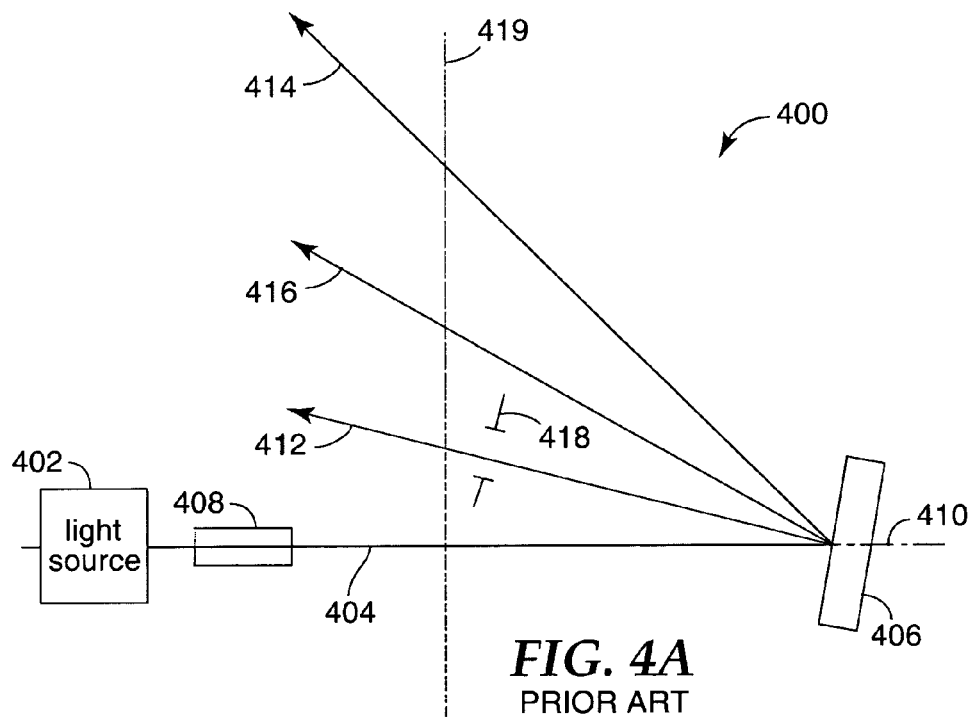
FIG. 4A and 4B schematically illustrate embodiments of equivalent optical systems used for explaining principles of the present invention.

A view of an equivalent projection system 400 is schematically presented in FIG. 4A. The equivalent projection system 400 maintains the different elements used to describe the use of the integrator with the pupils and apertures of the system, but omits elements unnecessary to this discussion for clarity.

Light 404, generated by the light source 402, propagates through the integrator 408 to the image display device 406. The light 404 is incident on the image display device 406 in a direction parallel to the axis 410. Light is reflected from the image display device in one of three directions. Image light 412, corresponding to the ON mirror state, lies closest to being parallel with the axis 410. The discarded light 414, corresponding to the OFF mirror state, lies farthest from parallel to the axis 410. The unswitched light 416 lies between the image light 412 and the discarded light 414. The aperture 418 represents the pupil of the projection lens system. It is assumed at this stage of the description that the tunnel integrator 408 does not change the shape of the illumination light beam 404.

Figure 5A:
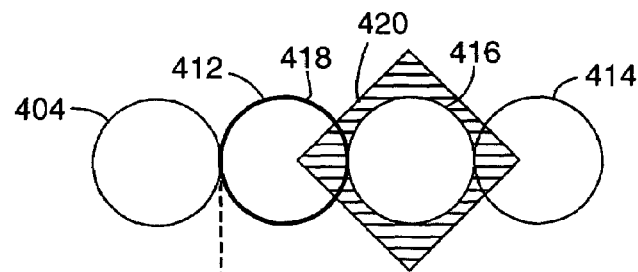
FIGS. 5A–5C schematically illustrate positions and shapes of the illumination light beam, the image light beam, the discarded light beam and the unswitched light beam in a projection system.

The relative positioning of the different light beams in a plane perpendicular to the axis 410, for example plane 419, marked with a dotted line, is schematically illustrated in FIG. 5A. The figure shows the illumination light beam 404, the image light beam 412, the discarded light beam 414 and the unswitched light beam 416. The image light beam 412 is centered on, and fills, the projection lens pupil 418.

One problem with tilted mirror arrays is that the unswitched light 416 is not only reflected, but also diffracts due to the regular pattern of the mirror array. Thus, the unswitched light beam 416 is surrounded by an area of diffracted light 420, schematically represented as a hatched area. The actual shape of the area of the diffracted light 420 depends on several factors and need not be exactly as illustrated. The diffracted light 420 overlaps with part of the image light beam 412 and with part of the discarded light beam 414. The extent to which the diffracted light overlaps the image light beam 412 is dependent on a number of factors, including the size and spacing of the mirrors on the image display device 406. Higher resolution images require smaller mirrors, which leads to an increased diffraction angle. Consequently, the diffracted light 420 creeps further into the image beam 412 as the resolution of the image display device is increased. The overlapping diffracted light 420 reduces the contrast of the image, since it can introduce light where the image should be dark, and so the dark state of the image may have a higher light intensity than is desirable.

Figure 4B:
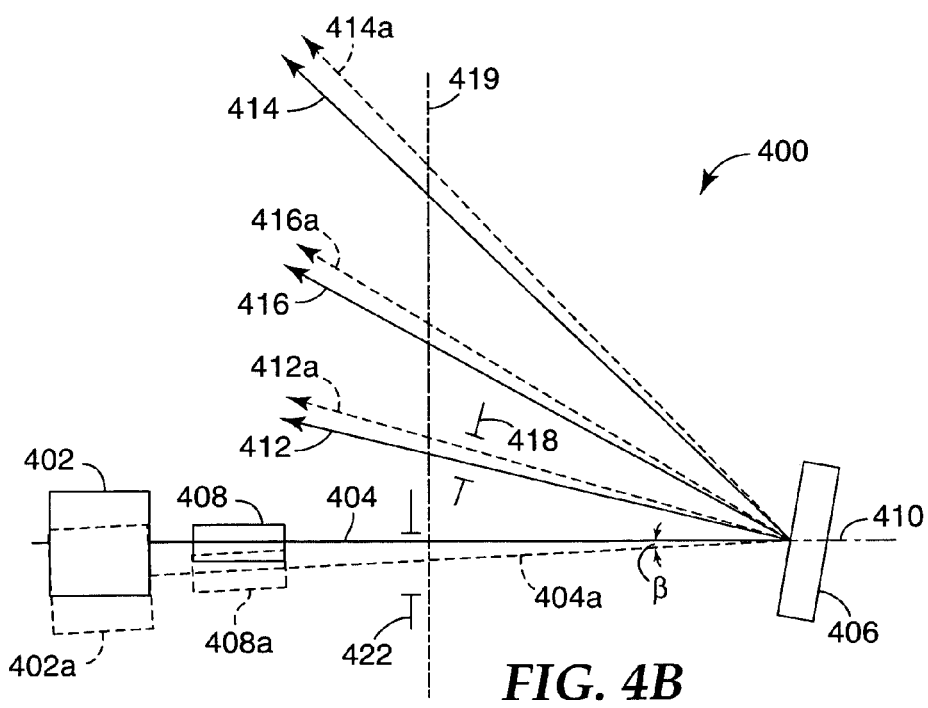
Figure 5B:
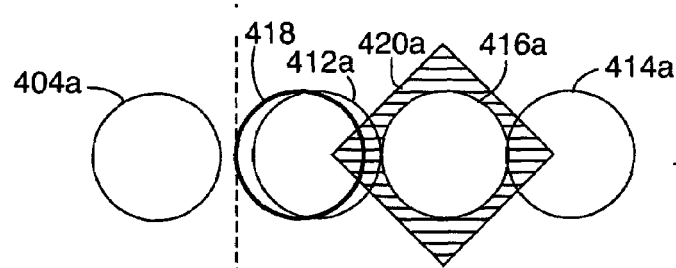

One way of reducing the extent by which the diffracted light 420 overlaps the image light is to change the angle of incidence of the illumination light beam 404 on the image display device 406 while maintaining the same positions of the image display device 406 and lens pupil 418. The rotated light source 402a and integrator 408a are shown in FIG. 4B in dashed lines. If the incident light beam 404a is rotated by $-\beta$ relative to the axis 410, then the resultant image light beam 412a, discarded light beam 414a and unswitched light beam 416a are all rotated through an angle of $+\beta$. The rotated light beams 404a, 412a, 414a and 416a are shown in FIG. 4B using dashed lines. As a result of this rotation, the image light beam 412a, the discarded light beam 414a and unswitched light beam 416a all shift relative to the lens pupil 418, as is shown in FIG. 5B. Furthermore, the diffracted light 420a is shifted away from the center of the lens pupil, and so the extent to which the diffracted light 420a overlaps the lens pupil 418 is reduced relative to the situation in FIG. 5A. The movement of the image light beam 412a results in some loss of brightness in the image compared to the situation shown in FIG. 5A but, where the tiltable mirrors are tiltable through an angle of $\pm 12°$, a rotation of $\beta$ in the range of about 2°–3° results in only a small decrease in brightness and a significant increase in the image contrast. Acceptable values of $\beta$ may depend on the particular application. Higher values of $\beta$ lead to reduced brightness.

A further improvement in contrast may be achieved by introducing a non-circular illumination aperture 422 into the illumination beam 404a. The aperture 422 has a long dimension parallel to the torsion hinges on which the tilting mirrors are mounted, and a short dimension perpendicular to the torsion hinges. Such apertures are further described in U.S. Pat. No. 5,442,414, and "DLP™ Projector System Optics Contrast-Enhancement Techniques" Application report, published by Texas Instruments, June 2001, both of which are incorporated herein by reference. The illumination aperture 422 is used to block at least part of the illumination beam 404a that contributes to that portion of the diffracted light 420a that overlaps with the projection lens pupil 418. Also, since the image beam 412a is offset from the projection lens pupil 418, a portion of the image beam 412a does not enter the pupil 418. Accordingly, that portion of the illumination beam 404a that contributes to that part of the image beam 412a that does not enter the pupil 418 can also be blocked by the aperture 422.

Figure 5C:
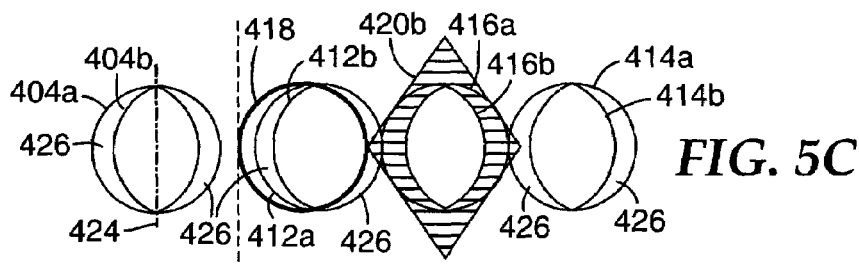

FIG. 5C shows how the aperture 422 affects the cross-sectional shapes of the different beams within the projection system 400. FIG. 5C assumes that the aperture 418 has a "cat-eye" shape, with a long dimension parallel to the axis 424. It will be appreciated, however, that other shapes of aperture 418 may also be used. Beam 404b shows the shape and position of the illumination light after passing through the cat-eye aperture 418. Beams 412b, 414b and 416b result from the use of the aperture 422, and are referred to as apertured beams. Portions 426 of the light beams 404a, 412a, 414a and 416a that are blocked by the aperture 422 are marked in the figure. The apertured image beam 412b has the same shape as the illumination beam 404b and, in the illustrated embodiment, one edge of the apertured image beam 412b matches to the pupil 418 of the projection lens. Also, the apertured discarded beam 414b and the apertured unswitched beam 416b have the same shape as the apertured illumination beam 404b. The apertured diffracted light 420b that arises from the apertured unswitched light 416b extends into the pupil 418 less than the unapertured diffracted light 420a, and may be excluded form the pupil altogether. Since the amount of diffracted light entering the pupil 418 is less, the contrast of the image is further increased.

Figure 5D:
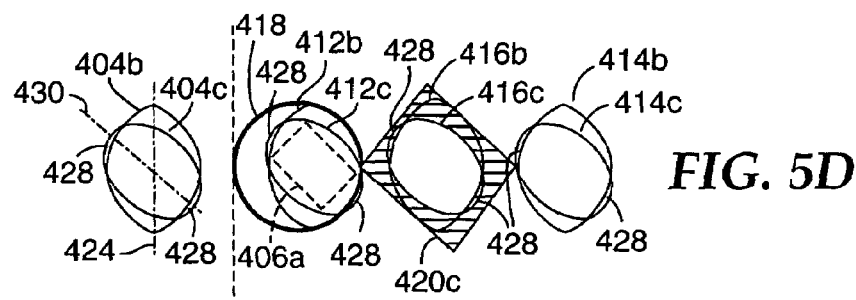
FIGS. 5D and 5E schematically illustrate positions and shapes of the illumination light beam, the image light beam, the discarded light beam and the unswitched light beam in different embodiments of projection systems according to principles of the present invention.

An integrator may be used to change the shape of the illumination beam so as to illuminate the image display device with more light. Such an integrator was described above with reference to FIG. 3. If the integrator 408*a* is, for example, a tapered tunnel integrator, then the shape of the illumination beam may be modified to being elliptical. The resulting illumination beam 404*c* is shown in FIG. 5D. Those portions 428 of the elliptical beam 404*c* blocked by the aperture 422 are labeled. The elliptical beam 404*c* has a major axis 430 that is parallel to the an edge of the displayed image while the axis 424 of the aperture 418 is oriented to be parallel to the hinges of the tiltable micromirrors of the image display device 406. Consequently, the long axis 430 of the elliptical beam 404*c* is not parallel to the axis 424 of the aperture 418.

The apertured elliptical illumination beam 404*c* has its shape set by the tapered integrator 408*a* to approximately match the aspect ratio of the image display device 406. Since more light passes through the aperture 422 when the beam 404*c* is elliptical, the use of the tapered integrator 408*a* results in the projected image being brighter.

Figure 5E:
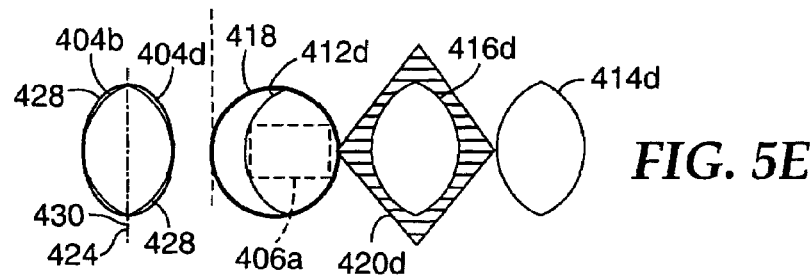

Superimposed on the shapes in angle space shown in FIGS. 5D and 5E, is a projection of the image generating area 406*a* of the image display device 406. The image generating area 406*a* is that area of the image display device 406 covered with tiltable mirrors. The image generating area 406*a* is shown in FIGS. 5D and 5E with dashed lines. For reasons of clarity, the projection of the image generating area 406*a* is omitted from FIGS. 5A–5C.

The divergence of the light output from the integrator 408*a* is narrowed in at least one dimension and, assuming that the optical losses associated with the tapered tunnel integrator are about the same as those of a non-tapered tunnel integrator, the intensity of the illumination beam 404*c* is higher than that of illumination beam 404*b*. Consequently, more illumination light passes through the aperture 422 to fall on the image generating area 406*a* of the image display device 406, and so the resulting image is brighter. Hence, the use of an integrator, such as a tapered tunnel integrator, that changes the shape of the light beam allows the production of brighter images. It will be appreciated that, even if the tapered tunnel integrator introduces more optical losses than a non-tapered tunnel integrator, there may still be a benefit to using the tapered integrator, so long as the increased losses are not greater than the increased intensity resulting from the use of the tapered integrator.

The aspect ratio of the image generating area 406*a* may be, for example, 16:9 where the image display device 406 is being used to project wide screen television images. It will be appreciated that the beams 412, 412*a*, 412*b*, 412*c*, 414, 414*a*, 414*b*, 414*c*, 416, 416*a*, 416*b* and 416*c* are shown without any aperturing effect from the image display device 406 itself.

Beams 412*c*, 414*c* and 416*c* result from the use of the aperture 422 and the tapered tunnel integrator 408*a*, and are referred to as apertured elliptical beams. The apertured elliptical image beam 412*c* has the same shape as the apertured elliptical illumination beam 404*c*. Also, the apertured elliptical discarded beam 414*c* and the apertured elliptical unswitched beam 416*c* have the same shape as the apertured elliptical illumination beam 404*c*. The apertured diffracted light 420*c* that arises from the apertured elliptical unswitched light 416*c* does not extend into the pupil 418. Since the amount of diffracted light entering the pupil 418 is reduced, the contrast of the image is further increased. Thus, the combination of the non-circular aperture 422 and the tapered tunnel integrator 408*a* result in both an increase in the brightness and an increase in the contrast.

EXAMPLE

The effectiveness of using a tapered tunnel integrator and a cat-eye aperture was investigated using a numerical model. In the model, the input to the tapered tunnel integrator was assumed to be 4.5 mm×4.5 mm, and its output was 4.5 mm×8 mm, corresponding to an aspect ratio of 16:9. The sides of the tapered tunnel integrator were assumed to be flat, like the embodiment illustrated in FIG. 3. Since étendue is conserved on passing through the tunnel integrator, the fact that the output aperture is larger in one dimension results in the divergence of the light in that dimension being reduced. Accordingly, the output light is squeezed into an ellipse whose ratio of minor axis length to major axis length is equal to the ratio of the width and height of the output aperture. Thus, the ratio of the minor axis to major axis of the elliptical beam is 4.8/8=0.5625.

The relative area of the circular beam 404*a* is taken as 1, and so the elliptical beam 404*c* has a relative area of 0.5625. The area of the circular beam after passing through the cat-eye is 0.788, while the area of the elliptical beam after passing through the cat-eye aperture is 0.5262. Thus, 93.5% (=0.5262/0.5625) of the elliptical beam passes through the cat-eye, whereas only 78.8% of the circular beam passes through the cat-eye. The efficiency of illuminating the image display device is, therefore, significantly higher when the elliptical beam is used. Thus, the use of the tapered tunnel integrator compensates at least in part for the loss of brightness that arises from tilting the illumination beam.

A number of variations of the projection system, compared with that described above, may be used while still remaining within the scope of the claims. For example, the non-circular aperture need not be a cat-eye aperture, but may be formed in other shapes while still being effective at reducing the amount of diffracted light overlapping the image light beam. In addition, the integrator need not only generate an elliptical beam, but may produce other non-circular shapes of light beams.

Furthermore, the tiltable mirror array need not have the torsion hinges set diagonal relative to the image formed by the image display device, but the hinges may be parallel to one of the sides of the image. In such a case, the long dimension of the non-circular aperture may be set parallel to the hinges, with the result that the major axis of the elliptical beam may be parallel to the long dimension of the non-circular aperture. Such a situation is schematically illustrated in FIG. 5E, which shows a non-circular beam 404*d* having a major axis 430 parallel to the long dimension 424 of the non-circular aperture 422. In the illustrated embodiment, the beam 404*d* from the integrator 408*a* slightly overfills the aperture 422, and so some portions 428 of the beam 404*d* are blocked by the aperture 422. The image beam 412*d* is the projected size of the aperture 422. The image generating area 406*a* has an edge that is parallel to the major axis 430 of the beam 404*d*, with the result that the image display device 406 is more efficiently illuminated than in the situation shown in FIG. 5C. Also, diffracted light 420*d* is present with the unswitched beam 416*d*, and there is a discarded light beam 414*d*.

Although the description provided above describes the use of a tapered tunnel integrator to produce a non-circular illumination beam that is incident on the non-circular aperture, it is not intended that the invention be so limited. A light source capable of generating a light beam having a non-circular cross-section perpendicular to the direction of propagation may also use other approaches to generating the non-circular beam of light, for example through the use of refractive optics, diffractive optics or other reflective optics, such as curved reflective optics.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. An image display system, comprising:
   an integrator capable of producing an output light beam having an angular distribution that is greater in a first dimension across the beam than in a second dimension across the beam orthogonal to the first dimension when illuminated by an input light beam that has the same angular distribution in the first and second dimensions;
   an image display unit disposed on the path of the output light beam, the image display unit comprising an array of tiltable mirrors; and
   a non-circular aperture disposed on the path of the output light beam, between the integrator and the image display unit.

2. A system as recited in claim 1, further comprising a light source to produce the circular input light beam.

3. A system as recited in claim 1, wherein the integrator is a tapered tunnel integrator.

4. A system as recited in claim 1, further comprising a color filter unit disposed to filter light incident on the image display unit.

5. A system as recited in claim 1, further comprising a projection lens unit to project an image light beam produced by the image display unit.

6. A system as recited in claim 1, further comprising a projection lens unit to project an image light beam produced by the image display unit.

7. A system as recited in claim 6, further comprising a totally internally reflecting prism unit disposed between the image display unit and the projection lens unit.

8. A system as recited in claim 6, wherein the projection lens unit includes a projection lens pupil having a center, the center of the projection lens pupil being non-coincident with a central ray of the image light beam.

9. A system as recited in claim 1, wherein the tiltable mirrors are tiltable about respective axes, the axes being parallel to a pivot axis.

10. A system as recited in claim 9, wherein the output light beam has a major axis and a minor axis, and neither the major axis nor the minor axis is parallel to the pivot axis.

11. A system as recited in claim 9, wherein the output light beam has a major axis and a minor axis, and the major axis is parallel to the pivot axis.

12. A system as recited in claim 1, wherein the non-circular aperture comprises an aperture having a long dimension, and the output light beam has a long dimension, the long dimension of the non-circular output light beam being non-parallel to the long dimension of the non-circular aperture.

13. An optical system, comprising:
    a light source capable of generating a beam of illumination light having a non-circular angular distribution;
    an image display unit illuminated by the beam of illumination light; and
    a non-circular aperture disposed on the path of the beam of illumination light having the non-circular cross-section, the non-circular aperture being disposed between the light source and the image display unit.

14. A system as recited in claim 13, wherein the image display unit comprises an array of tiltable mirrors, the mirrors being tiltable about respective mirror axes, the mirror axes being parallel to a pivot axis.

15. A system as recited in claim 14, wherein the non-circular aperture has a long dimension, the long dimension being parallel to the pivot axis.

16. A system as recited in claim 14, wherein the non-circular angular distribution of the illumination light defines a long dimension and a short dimension perpendicular to the long dimension, the long and short dimensions being non-parallel to the pivot axis.

17. A system as recited in claim 16, wherein the beam of illumination light has an elliptical angular distribution defining major and minor axes corresponding to the long and short dimensions respectively.

18. A system as recited in claim 14, wherein the non-circular cross-section of the illumination light defines a long dimension and a short dimension perpendicular to the long dimension, one of the long and short dimensions being parallel to the pivot axis.

19. A system as recited in claim 18, wherein the beam of illumination light has an elliptical angular distribution defining major and minor axes corresponding to the long and short dimensions respectively.

20. A system as recited in claim 13, wherein the beam of illumination light has an elliptical cross-section.

21. A system as recited in claim 13, wherein the light source comprises a light generator unit producing a first light beam and a tunnel integrator, the first light beam being input to the tunnel integrator, and an output from the tunnel integrator comprising the beam of illumination light.

22. A system as recited in claim 13, further comprising a projection lens unit disposed to project an image light beam received from the image display unit.

23. A system as recited in claim 22, wherein the projection lens unit includes a projection lens pupil having a center, the center of the projection lens pupil being non-coincident with a central ray of the image light beam.

24. A system as recited in claim 13, further comprising a color filter unit disposed in the illumination light to filter light incident on the image display unit.

25. A system as recited in claim 13, wherein the non-circular angular distribution defines a major axis, and the non-circular aperture has a long dimension non-parallel to the major axis.

* * * * *